J. DUNN.
Washing-Machine
No. 202,421. Patented April 16, 1878.
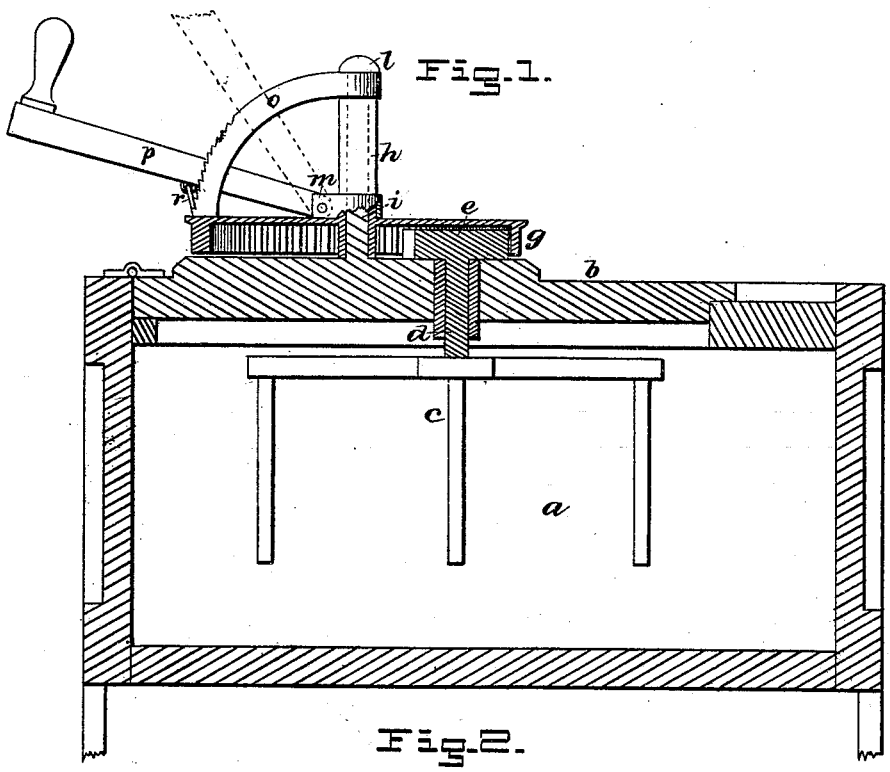
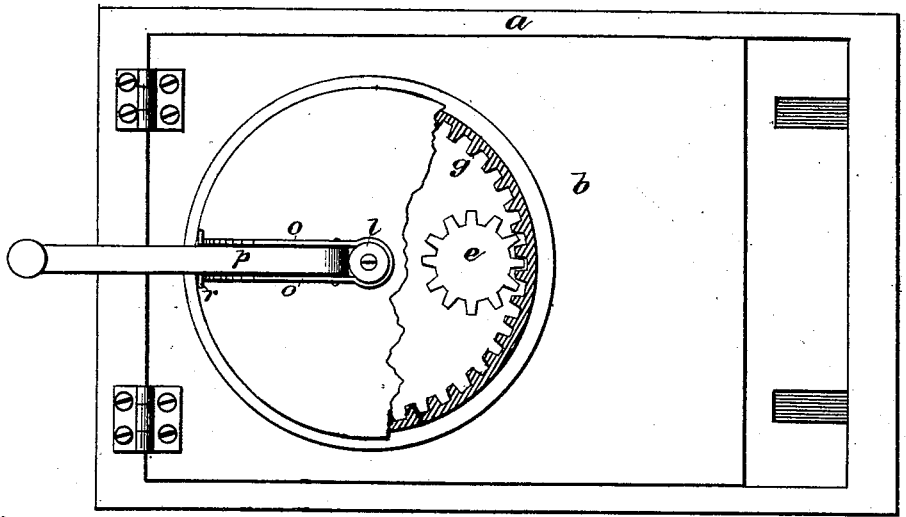
WITNESSES:
Jas. F. DuHamel
J. W. Garner
INVENTOR:
Jno. Dunn,
per
F. A. Lehmann,
Atty

UNITED STATES PATENT OFFICE.

JOHN DUNN, OF OSKALOOSA, IOWA.

IMPROVEMENT IN WASHING-MACHINES.

Specification forming part of Letters Patent No. 202,421, dated April 16, 1878; application filed March 2, 1878.

*To all whom it may concern:*

Be it known that I, JOHN DUNN, of Oskaloosa, in the county of Mahaska and State of Iowa, have invented certain new and useful Improvements in Washing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in washing-machines; and it consists in the combination and arrangement of parts, whereby the handle can be adjusted so as to sweep through a larger or a smaller circle, according to the speed desired or the amount of clothes to be washed, as will be more fully described hereinafter.

The accompanying drawings represent my invention.

Figure 1 is a vertical section of my machine; and Fig. 2 is a plan view, partly in section, of the same.

$a$ represents a wash tub or box, which may be of any desired shape, size, or construction, and which is provided with a hinged cover, $b$. Passing down through the center of this cover is the shaft $d$ of the washer $c$, and upon the top of this shaft $d$ is the pinion $e$, which meshes with the internal teeth of the large wheel $g$, which revolves upon the upright $i$. By thus using a large wheel having its gear entirely concealed greater speed is given to the washer, a neater appearance is given to the machine, and all danger of articles catching in the cogs is entirely done away with. Where the gear is exposed upon the top of the machine, it is always a source of danger in a household, especially where there are children, and for this reason I cover them up, so as to have them entirely hidden from sight. This large wheel is provided with a sleeve, $h$, which extends up to the top of the upright $i$, upon the top of which upright is fastened a suitable button or stop, $l$, to prevent the large wheel being raised upward. Between the two ears $m$, which project from the base of this sleeve, is pivoted the handle $p$, which handle is prevented from being moved laterally by the two notched circular guides $o$, which bear against opposite sides of the handle. Pivoted to the lower edge of this handle is the dog $r$, which, as the handle is raised upward, drops into the notches in the edge of the guide and holds the handle in an elevated position.

By thus raising the handle upward along the guides, it is evident that it can be swept through a larger or a smaller circle, as may be preferred. Where there is but a small quantity of clothes in the tub to be washed, by raising the handle upward the washer can be made to revolve with great rapidity; but where there is a considerable quantity of clothes in the tub, and where a greater effort will be required to operate the washer, the handle will be lowered down, so as to rest upon the top of the large wheel, and thus give the operator greater leverage in working the washer.

By having the cover hinged, as here shown, and the washer connected to its under side, it is evident that the cover may be raised upward, so as to elevate the washer entirely out of the tub, to allow the clothes to be placed in or taken out at will.

Having thus described my invention, I claim—

1. The combination of the washer $c$, having the shaft $d$, pinion $e$, large wheel $g$, having internal gears that are concealed from sight, and an operating handle or lever, substantially as shown.

2. The combination of the pivoted handle, provided with the dog $r$, notched guides, large wheel $g$, provided with the sleeve $h$, and internal cogs, pinion $e$, shaft $d$, washer $c$, and box or tub $a$, substantially as set forth.

In testimony that I claim the foregoing I have hereunto set my hand this 19th day of February, 1878.

JOHN DUNN.

Witnesses:
　DANIEL CONFER,
　WM. KENNEDY.